US007311624B2

(12) United States Patent
Lee

(10) Patent No.: US 7,311,624 B2
(45) Date of Patent: Dec. 25, 2007

(54) APPARATUS FOR CONTROLLING SPEED OF A WATER PUMP

(75) Inventor: Chong Won Lee, Hwaseong (KR)

(73) Assignee: Hyundai Motor Company, Seoul (KR)

( * ) Notice: Subject to any disclaimer, the term of this patent is extended or adjusted under 35 U.S.C. 154(b) by 639 days.

(21) Appl. No.: 10/746,997

(22) Filed: Dec. 23, 2003

(65) Prior Publication Data

US 2005/0090351 A1 Apr. 28, 2005

(30) Foreign Application Priority Data

Oct. 23, 2003 (KR) ..................... 10-2003-0074282

(51) Int. Cl.
*F16H 63/12* (2006.01)
*F16H 9/12* (2006.01)
*F16H 9/20* (2006.01)

(52) U.S. Cl. ............................ 474/29; 474/17; 474/18

(58) Field of Classification Search ............ 474/11–13, 474/15, 17, 22, 26, 29–30, 46, 67–10; 236/10; 180/333; 123/41.11, 41.12, 436; 74/336 R; 417/362–364
See application file for complete search history.

(56) References Cited

U.S. PATENT DOCUMENTS

| | | | | | |
|---|---|---|---|---|---|
| 2,308,507 | A * | 1/1943 | Hallinan | ...................... | 236/10 |
| 2,463,031 | A * | 3/1949 | Hallinan | ...................... | 474/22 |
| 2,917,937 | A * | 12/1959 | Dodge | ...................... | 74/336 R |
| 2,983,157 | A * | 5/1961 | Pokorny | ...................... | 474/22 |
| 3,180,305 | A * | 4/1965 | Gower-Rempel | ........... | 180/333 |
| 3,381,542 | A * | 5/1968 | Close | .......................... | 474/30 |
| 3,869,932 | A * | 3/1975 | Fletcher | ....................... | 474/46 |
| 3,981,205 | A * | 9/1976 | Avramidis et al. | ............ | 474/13 |
| 4,809,841 | A * | 3/1989 | Kitamura | .................... | 198/330 |
| 5,267,907 | A * | 12/1993 | Hedeen | ....................... | 474/69 |
| 6,186,915 | B1 * | 2/2001 | Dietl | ............................. | 474/8 |
| 6,270,436 | B1 * | 8/2001 | Reik et al. | ...................... | 474/8 |
| 6,585,615 | B2 * | 7/2003 | Uota | ........................... | 474/17 |

FOREIGN PATENT DOCUMENTS

| | | |
|---|---|---|
| JP | 60-69317 | 5/1985 |
| JP | (60-190675 A * | 9/1985 |
| JP | 61-059053 | 3/1986 |
| JP | 61-082062 | 4/1986 |
| JP | 10-159874 | 6/1998 |
| JP | 10-122177 | 12/1998 |
| JP | 2002-188443 | 7/2002 |

* cited by examiner

*Primary Examiner*—Marcus Charles
(74) *Attorney, Agent, or Firm*—Morgan Lewis & Bockius LLP

(57) ABSTRACT

For enhancement of heating performance of a vehicle, operating speed of a water pump of an engine is varied in accordance with engine operation conditions, so a speed of a coolant temperature increase can be accelerated when needed.

4 Claims, 5 Drawing Sheets

(a)

(b)

APPARATUS FOR CONTROLLING SPEED OF A WATER PUMP

CROSS-REFERENCE TO RELATED APPLICATIONS

This application claims priority of Korean Application No. 10-2003-0074282, filed on Oct. 23, 2003, the disclosure of which is incorporated fully herein by reference.

FIELD OF THE INVENTION

Generally, the present invention relates to an engine of a vehicle. More particularly, the present invention relates to an apparatus for controlling speed of a water pump of an engine of a vehicle.

BACKGROUND OF THE INVENTION

An engine is usually provided with a water pump for forcibly circulating coolant through the engine. The water pump rotates at a speed proportional to a rotation speed of the engine.

In general, a heating function of a vehicle has a close dependence on the coolant temperature. When a heater switch is turned on, hot air is immediately supplied to an interior room in the case that the coolant temperature is high, but in the case that the coolant temperature is low, only cold air can be supplied to the interior room until the coolant temperature is appropriately raised. When the engine is driven at a low speed, the coolant temperature does not rise quickly, so response to the heater switch becomes very slow.

In order to more quickly heat the interior room, some vehicles are provided with an additional heating apparatus in an air circulation duct system, for heating air passing therethrough. Such an additional heating apparatus causes volumetric efficiency of the interior room to be deteriorated and also causes cost of production to be raised. In addition, additional energy consumed for driving such an addition heating apparatus acts as an additional load on the engine, so fuel efficiency of the engine is deteriorated.

The information disclosed in this Background of the Invention section is only for enhancement of understanding of the background of the invention and should not be taken as an acknowledgement or any form of suggestion that this information forms the prior art that is already known in this country to a person of ordinary skill in the art.

SUMMARY OF THE INVENTION

Embodiments of the present invention provide an apparatus for controlling speed of a water pump of an engine having non-limiting advantages of varying operating speed of the water pump in accordance with engine operation conditions.

An exemplary apparatus for controlling speed of a water pump of an engine according to an embodiment of the present invention includes a variable pulley, a belt, actuators, and an electronic control unit for controlling the actuators. The variable pulley includes first and second bodies slidably formed on an exterior side of a driving shaft of the water pump. The belt is wound between the first and second bodies, for connecting the variable pulley to a crank pulley. The actuators are disposed at both sides of the variable pulley, for activating sliding operation of the first and second bodies such that a wound height of the belt may be varied, the wound height being an operating radius of the variable pulley.

In a further embodiment, the electronic control unit controls the actuators such that the operating radius of the variable pulley is increased when a heater switch is turned on and the engine is running at a low speed.

In a further embodiment, even when the engine is running at a low speed and the heater switch is turned on, the ECU does not activate the actuators but rather it maintains the operating radius of the variable pulley as reduced in the case that the coolant temperature is above a predetermined temperature that is sufficient to heat the interior room.

An exemplary apparatus for controlling a speed of a water pump of an engine according to another embodiment of the present invention includes a pump pulley, a pump driving shaft, a clutch, an oil supply line, an oil drain line, first and second solenoid valves, and a controller. The pump pulley is connected to a crank pulley by a belt. The pump driving shaft transmits torque from the pump pulley to an impeller. The clutch is dividedly disposed on the pump driving shaft, for controlling rotation speed of the impeller by varying its power transmission rate according to a control of oil supplied thereto. The oil supply line and the oil drain line respectively interconnect an oil pan and the clutch. The oil pump is disposed on the oil supply line. The first and second solenoid valves are respectively mounted on the oil supply line and the oil drain line, for controlling oil supplied to the clutch and oil drained therefrom. The controller controls the first and second solenoid valves in accordance with at least one engine driving condition.

In a further embodiment, the clutch includes a clutch housing; a driving plate disposed in the clutch housing and connected to the pump pulley; a driven plate disposed in the clutch housing and connected to the impeller, the driven plate facing the driving plate; and an oil passage formed between the driving and driven pulleys such that a power transmission rate from the driving plate to the driven plate proportionally varies with an amount of oil supplied to the oil passage.

In a further embodiment, the controller includes an electronic control unit and a coolant temperature sensor for detecting a coolant temperature. In this case, when the heater switch is turned on, the engine is running at a low speed, and the coolant temperature is below a predetermined temperature, the electronic control unit opens the second solenoid valve on the oil drain line for accelerating draining of oil from the clutch housing such that the rotation speed of the impeller becomes reduced.

In another further embodiment, first and second oil flow meters measure an amount of oil supplied to or drained from the clutch respectively through the oil supply line and the oil drain line, wherein the ECU controls the amount of oil supplied to or drained from the clutch on the basis of oil flow detected by the first and second oil flow meters.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

An embodiment of the present invention will hereinafter be described in detail with reference to the accompanying drawings.

Figure 1:
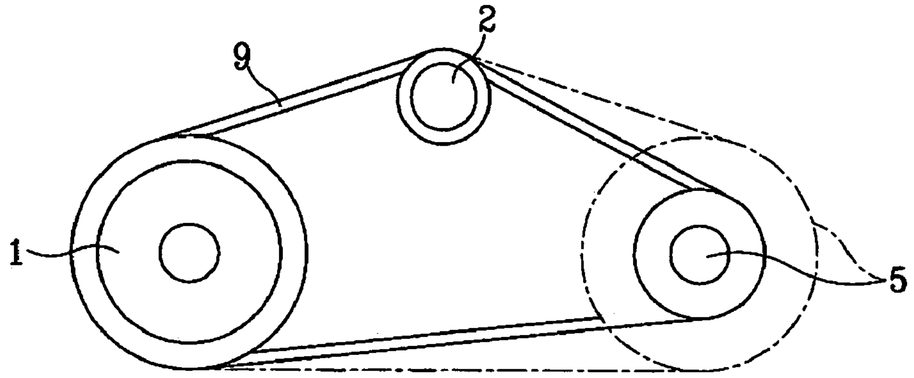
FIG. 1 illustrates an apparatus for controlling a speed of a water pump according to an embodiment of the present invention.

As shown in FIG. 1, according to an embodiment of the present invention, a crank pulley 1 and a pump pulley 5 of a water pump are connected by a belt 9. The pump pulley 5 of the water pump may be a variable pulley which can vary its operating radius. When the operating radius of the variable pulley 5 is reduced, the running speed of the water pump becomes accordingly increased. When the operating radius of the variable pulley 5 is increased, the running speed of the water pump becomes accordingly decreased.

An auto-tensioner 2 is disposed between the crank pulley 1 and the variable pulley 5, for automatically adjusting tension of the belt 9 in accordance with varying of the operating radius of the variable pulley 5.

Figure 2:
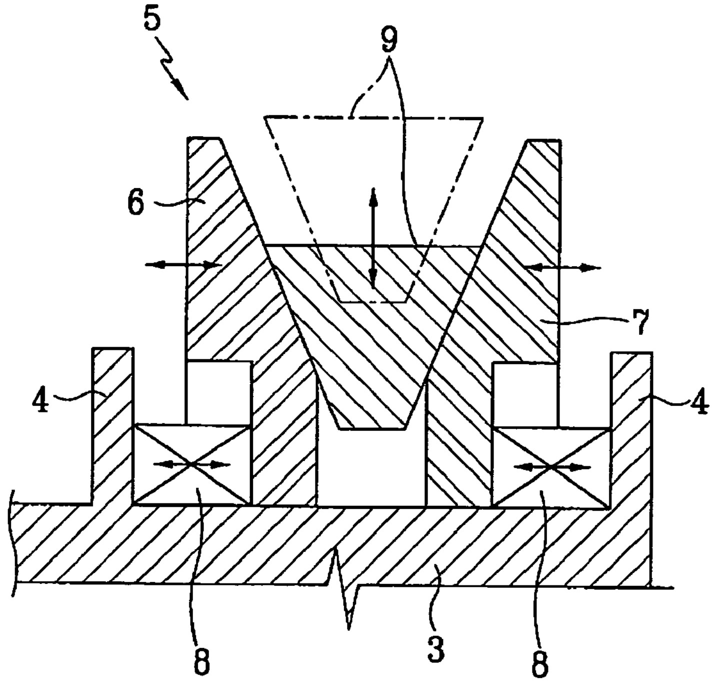
FIG. 2 is a sectional view of a variable pulley of a water pump according to an embodiment of the present invention.

As shown in FIG. 2, stoppers 4 are formed on an exterior circumference of a driving shaft 3 of the water pump with a predetermined distance therebetween, and first and second bodies 6 and 7 are slidably disposed between the stoppers 4.

A belt 9 is wound around and between the first and second bodies 6 and 7, and a wound height of the belt 9 is raised or lowered according to a width between the first and second bodies 6 and 7. When the width between the first and second bodies 6 and 7 is narrowed, the wound height of the belt 9 increases and the operating radius of the variable pulley 5 also increases such that the rotation speed of the driving shaft 3 is reduced. When the width between the first and second bodies 6 and 7 is widened, the wound height of the belt 9 decreases and the operating radius of the variable pulley 5 also decreases such that the rotation speed of the driving shaft 3 is increased.

Actuators 8 are formed between the stopper 4 and the first and second bodies 6 and 7, for forcing sliding of the first and second bodies 6 and 7. The actuators 8 are hydraulically or pneumatically operated in order to slide the first and second bodies 6 and 7. The actuators 8 are controlled by an electronic control unit (ECU) 11.

When a predetermined engine driving condition is satisfied, e.g., when the heater switch 10 is turned on, the engine is running at a low speed, and the coolant temperature detected by the coolant temperature sensor 12 is below a predetermined temperature, the ECU 11 activates the actuators 8 such that the width between the first and second bodies 6 and 7 of the variable pulley 5 is reduced, and thereby the operating radius of the variable pulley 5 is increased. Whether the engine is running at a low speed may be determined by whether the engine speed exceeds a predetermined level.

Figure 3:
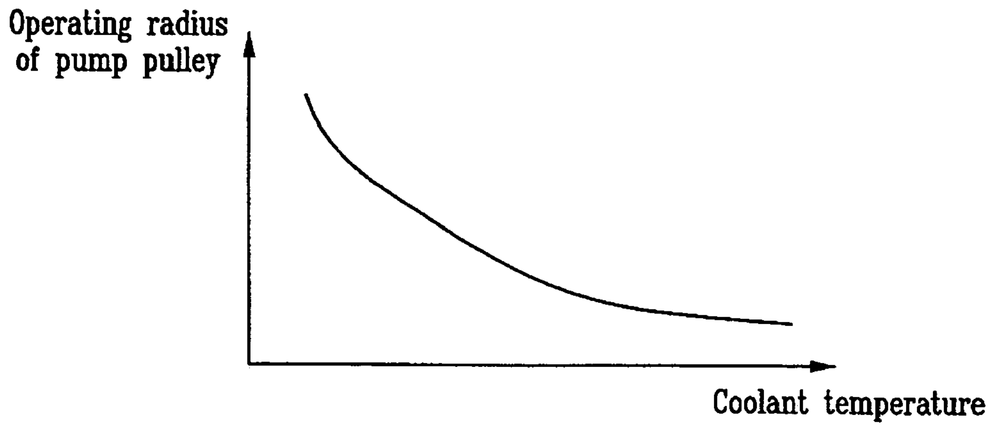
FIG. 3 is a graph showing the relationship between thean operating radius of a variable pulley of a water pump and coolant temperature according to an embodiment of the present invention.
Figure 4:
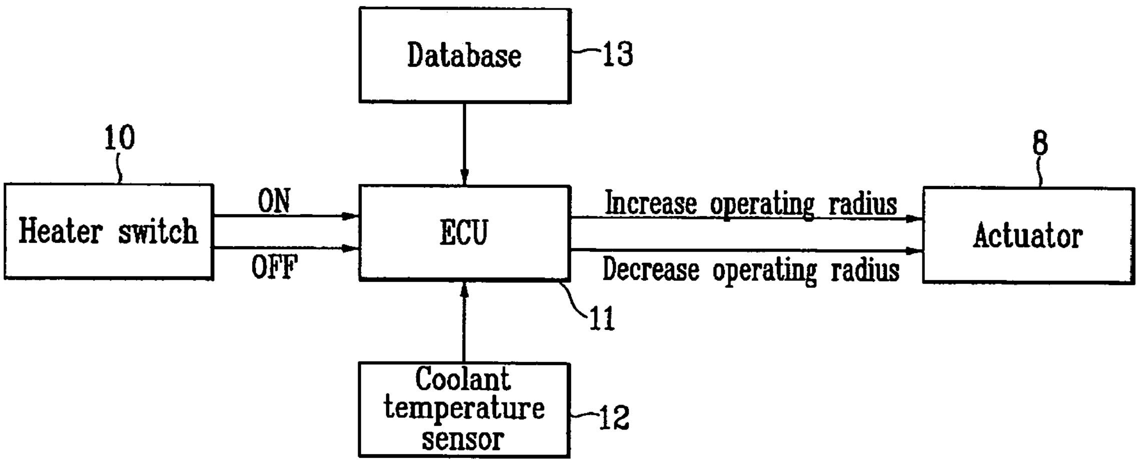
FIG. 4 is a block diagram for a controller unit according to an embodiment of the present invention.
Figure 5:
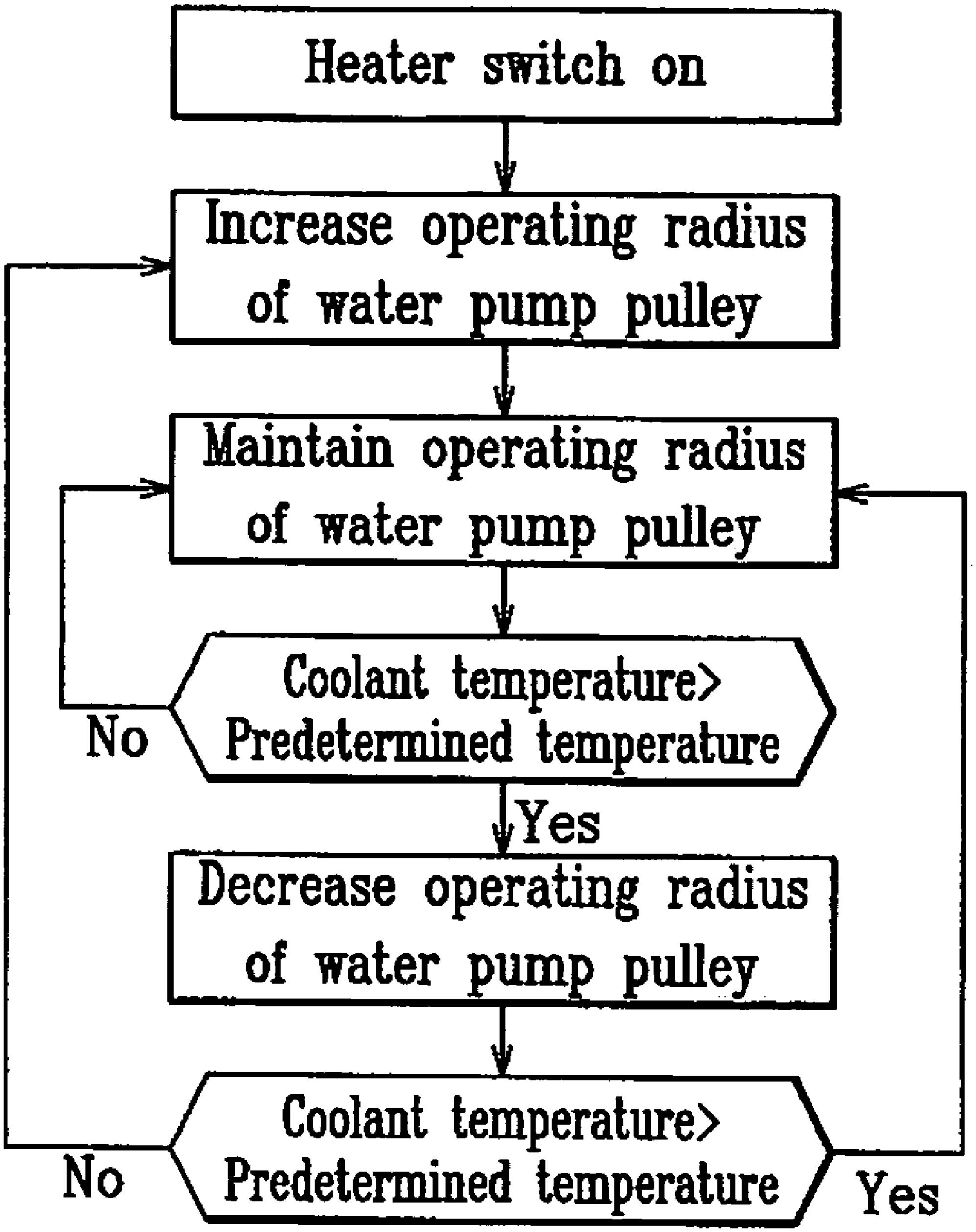
FIG. 5 is a flowchart showing a method for controlling a variable pulley of a water pump according to an embodiment of the present invention.

As shown in FIG. 3, the ECU 11 may control the operating radius of the variable pulley 5 to be inversely proportional to the coolant temperature.

When the operating radius of the variable pulley 5 is increased, the rotation speed of the driving shaft 3 of the water pump is accordingly decreased, and thereby coolant circulation in the engine is lowered. Therefore, the coolant temperature in the engine may rapidly increase, and accordingly the temperature of the coolant supplied to the heater core in an interior room of the vehicle may also rapidly increase. Therefore, hot air can be circulated in the interior room of the vehicle more quickly.

Control values by which the ECU 11 controls the actuators 8 to realize the operating radius of the pump pulley as shown in FIG. 3 are stored in a database 13 as a map table. Detailed values of the map table stored in the database 13, which may depend on detailed specifications of the engine and the vehicle, may be determined and set experimentally by a person of ordinary skill in the art based on the teachings of the present invention.

When the coolant temperature becomes higher than the predetermined temperature or the engine speed becomes higher than the predetermined level, the ECU 11 controls the actuators 8 to their original state such that the distance between the first and second bodies 6 and 7 of the variable pulley 5 and thereby the operating radius thereof becomes smaller.

In addition, even when the engine is running at a low speed and the heater switch is turned on, the ECU 11 does not activate the actuators 8 but rather maintains the operating radius of the variable pulley 5 as reduced in the case that the coolant temperature is above a predetermined temperature that is sufficient to heat the interior room.

Figure 6:
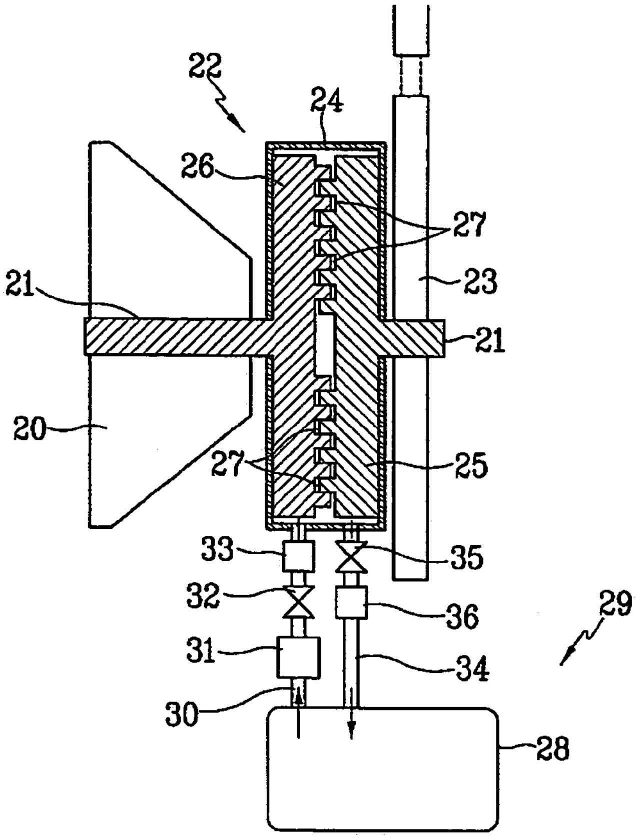
FIG. 6 is a sectional view of a water pump according to an alternative embodiment of the present invention.
Figure 7:
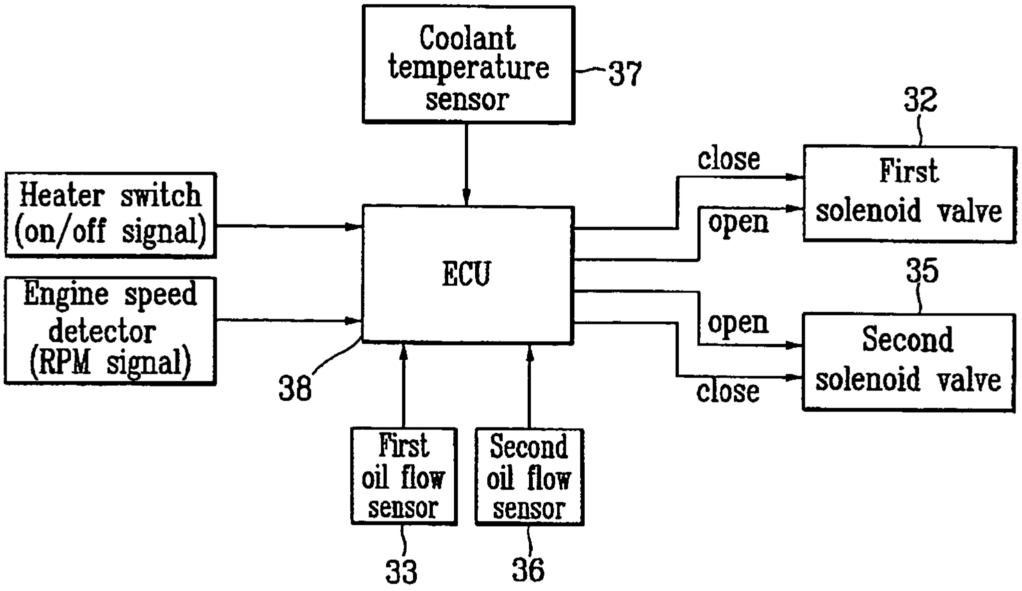
FIG. 7 is a block diagram for a controller unit according to an alternative embodiment of the present invention.
Figure 8:
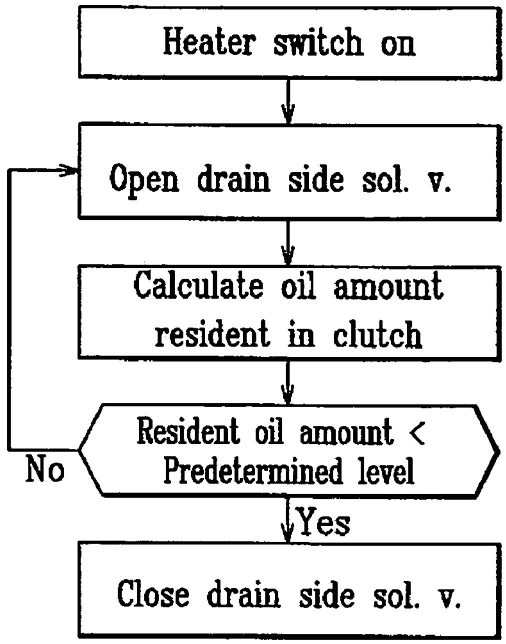
FIG. 8 is a flowchart showing a method for controlling a clutch of a water pump according to an alternative embodiment of the present invention.
Figure 8:
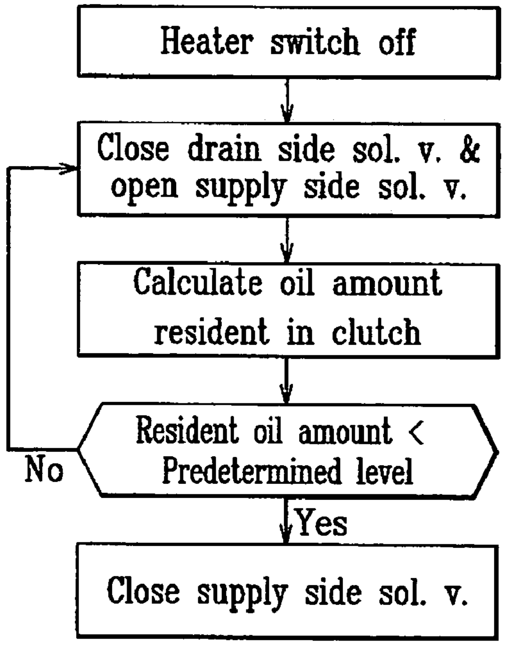

An alternative embodiment of the present invention is hereinafter described in detail with reference to FIGS. 6-8. As shown in the drawings, a water pump is provided with a pump pulley 23 connected to a crank pulley by a belt. The water pump includes a pump driving shaft 21 connecting the pump pulley 23 and an impeller 20. The pump driving shaft 21 transmits torque from the pump pulley 23 to the impeller 20. The pump driving shaft 21 is divided by a clutch 22 for varying torque supplied to the impeller 20. An oil supply unit 29 supplies oil to the clutch 22 for operation thereof. A controller controls oil flow to the clutch 22 by controlling the oil supply unit 29 in accordance with at least one engine driving condition.

The clutch 22 includes a clutch housing 24. A driving plate 25 and a driven plate 26 are disposed in the clutch housing 24 facing each other. The driving plate 25 is connected to the pump pulley 23, and the driven plate 26 is connected to the impeller 20. An oil passage 27 is formed between the driving and driven pulleys 25 and 26 such that a power transmission rate from the driving plate 25 to the driven plate 26 proportionally varies with an amount of oil supplied to the oil passage 27.

The oil supply unit 29 includes an oil supply line 30 and an oil drain line 34 between an oil pan 28 and the clutch housing 24 of the clutch 22. An oil pump 31 is formed on the oil supply line 30. First and second solenoid valves 32 and 35 are respectively mounted on the oil supply line 30 and the oil drain line 34, for controlling oil supplied to the clutch 22 and oil drained therefrom.

The controller controls the first and second solenoid valves 32 and 35, for controlling oil flow to the clutch 22.

The controller includes first and second oil flow meters 33 and 36 for measuring an amount of oil supplied to or drained from the clutch 22 respectively through the oil supply line 30 and the oil drain line 34, a coolant temperature sensor 37 for detecting the coolant temperature, and an electronic control unit (ECU) 38.

When the heater switch is turned on, the engine is running at low speed, and the coolant temperature detected by the coolant temperature sensor 37 is below a predetermined temperature, the ECU 38 opens the second solenoid valve 35 on the oil drain line 34 for accelerating draining of oil from the clutch housing 24, by which a heating performance may be enhanced.

When the coolant temperature is above the predetermined temperature or the engine speed becomes higher than the predetermined level, the ECU 38 off-controls the second solenoid valve 35 such that oil draining is stopped and on-controls the first solenoid valve 32 such that oil is supplied to the clutch 22.

When the oil is supplied to or drained from the clutch housing 24 by opening of the first or second solenoid valves 32 or 35, the ECU 38 calculates an amount of oil resident in the clutch housing 24 on the basis of oil flow detected by the first and second oil flow meters 33 and 36, and then controls on/off operation of the first and second solenoid valves 32 and 35 on the basis of the calculation.

When the oil is excessively drained from the clutch housing 24, the clutch housing 24 may be empty of oil. So, the ECU 38 calculates the amount of oil resident in the clutch housing 24 on the basis of oil flow detected by the first and second oil flow meters 33 and 36 such that it may off-control the second solenoid valve 35 in the case that the oil contained in the clutch housing 24 is almost excessively drained.

As described above, according to an alternative embodiment of the present invention, in a normal condition, the clutch 22 is controlled such that the torque received at the pump pulley 23 is directly transmitted to the impeller 20.

When the heater switch is turned on, the engine is running at a low speed, and the coolant temperature is below a predetermined temperature, the clutch 22 is controlled such that the torque received at the pump pulley is partially transmitted to the impeller 20 and thereby coolant circulation in the engine is reduced in order to rapidly increase the coolant temperature.

The electronic control units (ECU) and other controller used in embodiments of the present invention, unless otherwise described, may comprise a processor and other associated hardware as may be selected and programmed by a person of ordinary skill in the art based on the teachings herein contained.

As described above, according to an embodiment of the present invention, the operating speed of a water pump of an engine is varied in accordance with engine operation conditions, so the speed of coolant temperature increase can be accelerated when needed, which enhances heating performance of a vehicle.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. An apparatus for controlling speed of a water pump of an engine, comprising:

a variable pulley including first and second bodies slidably formed on an exterior side of a driving shaft of the water pump;

a belt wound between the first and second bodies, for connecting the variable pulley to a crank pulley;

actuators disposed at both sides of the variable pulley, for activating sliding operation of the first and second bodies such that a wound height of the belt is varied, the wound height being an operating radius of the variable pulley; and an electronic control unit for controlling the actuators such that the operating radius of the variable pulley is varied in accordance with condition of a heater switch and the engine.

2. The apparatus of claim 1, wherein the electronic control unit controls the actuators such that the operating radius of the variable pulley is increased when the heater switch is turned on and the engine is running below a predetermined speed.

3. The apparatus of claim 1, wherein, the electronic control unit controls the actuators to maintain a reduced operating radius of the variable pulley in a case where the coolant temperature is above a predetermined temperature that is sufficient to heat the interior room.

4. The apparatus of claim 3, wherein said control occurs when the engine is running below a predetermined speed and the heater switch is turned on.

* * * * *